March 18, 1952  H. V. KERR  2,589,552
VALVE SPRING COMPRESSOR AND TENSION TESTER
Filed Aug. 14, 1947  2 SHEETS—SHEET 1
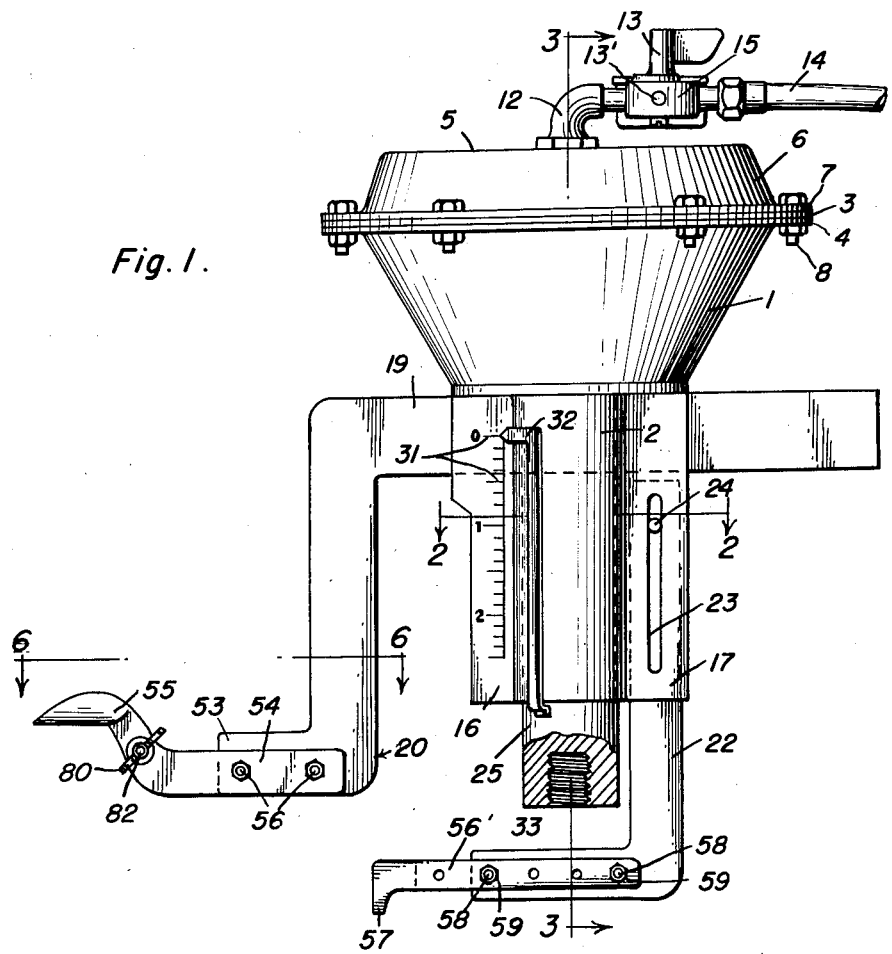
Fig. 1.
Fig. 2.
Inventor
Homer Virgil Kerr
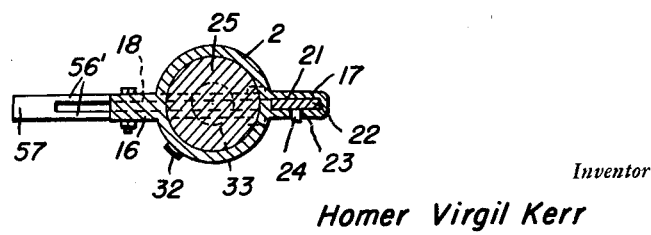
By
Attorneys March 18, 1952     H. V. KERR     2,589,552
VALVE SPRING COMPRESSOR AND TENSION TESTER
Filed Aug. 14, 1947     2 SHEETS—SHEET 2

Inventor

Homer Virgil Kerr

By Clarence A. O'Brien
and Harvey B. Jacobson
Attorneys

Patented Mar. 18, 1952

2,589,552

UNITED STATES PATENT OFFICE 2,589,552

VALVE SPRING COMPRESSOR AND TENSION TESTER

Homer Virgil Kerr, Clarksburg, W. Va., assignor of fifty per cent to Leonard H. Jarvis, Clarksburg, W. Va.

Application August 14, 1947, Serial No. 768,596

3 Claims. (Cl. 73—161)

This invention relates to improvements in valve spring compressors and tension testing apparatus.

An object of the invention is to provide an improved valve spring compressor and tension testing apparatus for use in connection with either L-head type engines or engines having overhead valves.

Another object of the invention is to provide an improved valve spring compressor and tension testing apparatus including an air chamber and cylinder disposed below the same, said air chamber being provided with a rubber diaphragm and being connected at its upper end with a valve controlled compressed air supply, said cylinder supporting a push rod for reciprocable movement therein, the same having an enlarged bearing head on its inner and upper ends which is held in engagement with the under surface of said rubber diaphragm by means of a coil spring disposed about said rod, and means supported respectively by said push rod and by said cylinder for engaging a fixed part of an engine block or cylinder head and the spring which is to be tested.

A further object of the invention is to provide an improved compressed air operated valve spring compressor and tension testing apparatus which will include an air chamber in which a rubber diaphragm is mounted, together with a cylinder formed integrally with said air chamber and an enlarged headed push rod reciprocably mounted therein, with interchangeable foot members adapted to be supported by said cylinder and by said push rod for engagement with a valve spring to be tested and to a fixed portion of an engine block or head, and a scale and indicator for indicating the compression and tension of the spring being tested.

A still further object of the invention is to provide an improved compressed air operated valve spring compressor and tension testing device which will be highly efficient in operation, and relatively inexpensive to manufacture and produce.

Other objects will appear as the description proceeds.

In the accompanying drawings which form a part of this application,

Figure 1 is a side elevation of the improved valve spring compressor and tension tester;

Figure 2 is a transverse sectional view taken on the line 2—2 of Figure 1;

Like characters of reference are used throughout the following specification and the accompanying drawings to designate corresponding parts.

Figure 3:
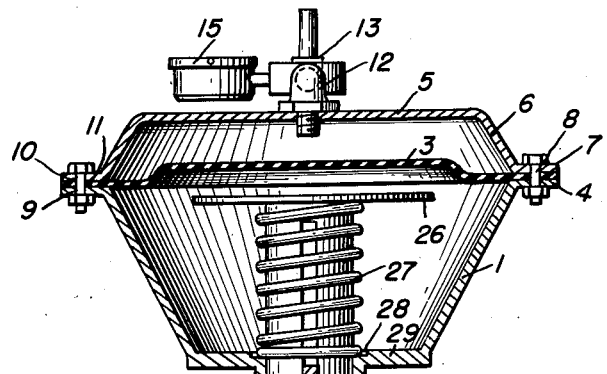
Figure 3 is a vertical sectional view taken on the line 3—3 of Figure 1.
Figure 4:
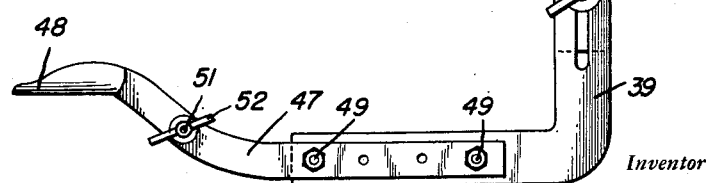
Figure 4 is a side elevation of a modified form of attachment bar used with the testing device while testing overhead valves.

In carrying out the invention, there is provided an improved form and construction of valve spring compressor and tension testing device or apparatus including a frusto-conical shape air chamber 1, and a cylinder 2 formed integrally and in axial alignment therewith.

A rubber diaphragm 3 will be disposed upon the annular seat or flange 4 formed about the upper end of the air chamber 1, and a closure member 5 formed with an outwardly and downwardly tapering side wall 6 terminating in the annular flange 7 will be disposed upon the peripheral edge of said rubber diaphragm 3 for securing the same in position. A plurality of bolts 8 will be disposed through openings 9 and 10 formed respectively through the flanges 4 and 7, and through openings 11 formed through the diaphragm 3, for providing an air-tight air chamber.

An elbow fitting 12 will be threaded through the closure member 5 and will be connected with a control valve 13 and a tubing 14 connected with a suitable source of compressed air (not shown). An air pressure gage 15 will be provided and coupled in the air inlet line to the air chamber 1, for readily and instantly indicating the air pressure therein when said control valve is operated. An air bleed outlet 13' will be formed in the side of the valve housing 13 for releasing the air pressure from the air chamber 1.

The cylinder 2 is formed with laterally extending oppositely disposed channel flanges 16 and 17, the flange 16 being formed with a transverse opening 18 for receiving the arm 19 of a bracket or attachment bar 20, and the channel flange 17 is formed with a vertical passage 21 for receiving the upper end of the L-shaped bracket or attachment bar 22.

A vertical slot 23 is formed through the front wall of the channel flange 17, and is adapted to receive and guide the laterally extending combined guide and stop pin 24 formed on the side of the L-shaped bracket or attachment bar 22 for limiting the vertical movement of the said bar 22.

The elongated push rod 25 is received in the cylinder 2 for reciprocable movement, being formed on its upper end with the enlarged disk-shaped head 26 which will be constantly in contact with the undersurface of the rubber diaphragm 3, being resiliently held by means of the coil spring 27 disposed about the push rod 25 with its upper end contacting the undersurface of the head 26 and its lower end received within the annular seat 28 in the upper surface of the bottom 29 of the air chamber 1.

A transverse slot 30 is formed through the push rod 25 and is adapted to be aligned with the slot 18 in the channel flange 16 for receiving the arm 19 of the bracket or attachment bar 20 for permitting vertical and transverse movement thereof.

A calibrated scale 31 is formed on the exterior surface of the channel flange 16 and cooperates with the offset elongated pointer or indicator finger 32 secured to the push rod 25 adjacent its lower end, as clearly illustrated in Figure 1 of the drawings.

The lower end of the push rod 25 is formed with a vertical threaded bore 33 in its lower end, and is adapted to threadably receive and support the threaded stud or screw bolt 34 which is threaded through the laterally extending plate 35 formed on the upper end of the central connecting body or strip and on the lower end of which the cylindrical spring engaging seat or socket member 36 is integrally formed.

Figure 5:
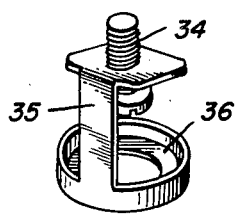
Figure 5 is a perspective view of a valve spring compressing head adapted to be threaded into the lower end of the push rod of the testing device for use while testing springs on overhead valves.
Figure 6:
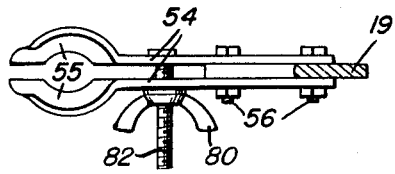
Figure 6 is a partial sectional view taken on the line 6—6 of Figure 1.

The attachment illustrated in Figure 5 of the drawings and comprising the parts 34, 35 and 36, is threaded into the threaded bore 33 in the lower end of the push rod 25 when the valve springs (not shown) in a valve overhead type engine are to be tested.

An auxiliary attachment bar 37 is provided for use with the attachment formed by the parts 34, 35 and 36 when the testing is being done on springs of overhead valves. The bar 37 will comprise a pair of cooperating L-shape members 38 and 39 whose adjacent inner ends will overlap, and will be slotted as at 40 to receive the locking bolts 41 and associated wing nuts 42.

A clamp arm 43 will be formed on the threaded stem 44 and will be adjustably supported in the threaded bearing or collar 45 on the L-shape member 38, being held in the desired adjustment by means of the wing nut 46, whereby the clamp arm 43 may be engaged over a suitable portion of the head block (not shown) of an overhead valve type engine (also not shown).

A pair of cooperating parallel extending arms 47 are adjustably secured to the L-shape member 39 by means of the bolts 49, and terminate at their outer ends in the spring engaging shoes 48. A bolt 51 and wing nut 52 are connected between the arms 47 to provide for closer clamping adjustment upon the shoes 48.

The short leg 53 of the attachment bar 20 is adapted to support the parallel arms 54 which terminate in the spring engaging shoes 55, being secured by means of the bolts 56. Likewise, a bolt 82 extends between the outer ends of the arms 54, and is held in adjusted position by the wing nut 80.

The attachment bar 22 is adapted to adjustably support the parallel arms 56′ which terminate in the downwardly extending legs 57 for positioning upon an engine block (not shown) when testing the springs used in an L-head type motor. The arms 56′ are held in the desired adjusted position by means of the bolts 58 and coupled nuts 59.

From the foregoing description, it will be understood and apparent that the mode of operation of the improved valve spring compressor and testing apparatus will be as follows: In Figure 1 of the official drawings, the device is shown as used when compressing and testing the springs in an L-head type motor or engine, and the attachment bar 20 is supported through the aligned slots 18 in the channel flange 16 and through the slot 30 in the push rod 25, and the attachment bar 22 is supported in the vertical channel 21 in the channel flange 17 with the downwardly extending legs 57 on the arms 56′ being in a position to be placed on any suitable portion of an engine block, with the shoes 55 supported by the attachment bar 20 being disposed under the springs being tested. When the apparatus is in the position just described, the valve 13 will be opened to permit compressed air to pass through the tubing 14 from the supply tank (not shown), and the compressed air will enter the upper portion of the air chamber above the rubber diaphragm 3, forcing the same with the disk-shaped head 26 on the upper end of the push rod 25 downwardly until the lower end of the latter seats upon the top of the horizontal arm of the member 22. Since the legs 57 supported by the attachment bar 22 are fixedly supported upon the engine block, when the air is admitted above the rubber diaphragm the air chamber 1 and the cylinder 2 together with the spring engaging shoes 55 on the attachment bar 20 will be raised under the action of the compressed air, thereby securing a reading upon the scale 31 since the indicator 32 is attached to the push rod 25.

When it is desired to compress and test the springs used in an overhead valve type engine, the attachment bar 20 is removed and the attachment bar 37 will be inserted in the transverse slot 18 in the channel flange and 30 in the push rod, and the attachment comprising the parts 34, 35 and 36 will be threaded into the threaded bore in the lower end of the push rod 25. The spring engaging shoes 48 will be inserted under the springs and the valve spring compressing head 36 will be disposed over the upper end of the springs, after which compressed air will be admitted into the air chamber 1 by opening the valve 13, which will cause the compressing of the spring being tested, the slot in the channel flange holding the bar 37, with the push bar reciprocable thereon. The scale 31 by the indicator 32 will indicate the condition and tension of said spring.

From the foregoing description, it will be apparent that there has been devised and provided a highly efficient form of valve spring compressor and tension tester for valve springs of L-head type motors or engines and also for valve springs of overhead valve type engines.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. A valve spring and tension testing device including an air chamber and a depending cylinder formed integrally therewith, a diaghragm in said air chamber, means for admitting a fluid under pressure to said air chamber above said diaphragm, a push rod disposed in said cylinder for reciprocable movement, said push rod having a transverse slot therein, an enlarged head on said push rod engageable with the undersurface of said diaphragm, resilient means disposed about said push rod engageable with said enlarged head and with said air chamber for resiliently holding said enlarged head constantly in contact with said diaphragm, a scale on said cylinder, a cooperating indicator on said push rod, and adjustable means engageable with a fixed support and with a spring being tested respectively supported by said push rod and by said cylinder and including a bracket arm disposed through the slot in the push rod.

2. A valve spring and tension tester device including an air chamber and a depending cylinder formed integrally therewith, a diaphragm in said air chamber, means for admitting a fluid under pressure to said air chamber above said diaphragm, a push rod disposed in said cylinder for reciprocable movement, an enlarged head on said push rod engageable with the undersurface of said diaphragm, resilient means disposed about said push rod engageable with said enlarged head and with said air chamber for resiliently holding said enlarged head constantly in contact with said diaphragm, a scale on said cylinder, a cooperating indicator on said push rod, means supported on said cylinder for engaging one end of a spring being tested and a bracket screw threaded in the lower end of said push rod engaging the opposite end of the spring being tested.

3. A valve spring and tension testing device including an air chamber and a depending cylinder formed integrally therewith, a diaphragm in said air chamber, means for admitting a fluid under pressure to said air chamber above said diaphragm, a push rod disposed in said cylinder for reciprocable movement, an enlarged head on said push rod engageable with the undersurface of said diaphragm, said rod having a transversely formed vertical slot, resilient means disposed about the slotted portion of the push rod and engageable with said enlarged head and with said air chamber for resiliently holding said enlarged head constantly in contact with said diaphragm, a scale on said cylinder, a cooperating indicator on said push rod, and an adjustable bracket inserted through the slot in the rod below the resilient means and a second adjustable bracket carried by the cylinder, said brackets being engageable with a fixed support and with a spring being tested, said cylinder having a transverse opening registrable with the vertical slot in the rod, said first mentioned bracket being received through the slot in the rod and the opening in the cylinder, the slot in the rod being of sufficient length to permit axial movement of the rod relative to the first bracket, the second bracket being slidably mounted on the cylinder parallel to the axis of the rod and having a portion engageable thereby whereby axial movement of the rod causes relative movement of spring engaging portions on the brackets.

HOMER VIRGIL KERR.

REFERENCES CITED

The following references are of record in the file of this patent:

UNITED STATES PATENTS

| Number | Name | Date |
| --- | --- | --- |
| 1,598,866 | Lovell | Sept. 7, 1926 |
| 1,822,587 | Essen | Sept. 8, 1931 |
| 2,066,585 | Sunnen | Jan. 5, 1937 |